United States Patent [19]

Furuya et al.

[11] Patent Number: 4,672,494
[45] Date of Patent: Jun. 9, 1987

[54] MAGNETIC HEAD FOR EFFECTING PERPENDICULAR MAGNETIC RECORDING

[75] Inventors: Nobuaki Furuya; Yasuhiko Nakayama, both of Kawasaki; Yoshio Watanabe, Kanagawa, all of Japan

[73] Assignee: Matsushita Electric Industrial Co., Ltd., Osaka, Japan

[21] Appl. No.: 640,595

[22] Filed: Aug. 14, 1984

[30] Foreign Application Priority Data

Sep. 1, 1983 [JP] Japan .................................. 58-161308
Sep. 2, 1983 [JP] Japan .................................. 58-162218

[51] Int. Cl.[4] .......................... G11B 5/127; G11B 5/23
[52] U.S. Cl. ..................................... 360/125; 360/119
[58] Field of Search .................. 360/113, 119, 125–127

[56] References Cited

U.S. PATENT DOCUMENTS

| 4,107,751 | 8/1978 | Shimoda | 360/122 |
| 4,383,284 | 5/1983 | Isshiki | 360/125 |
| 4,441,131 | 4/1984 | Osanai | 360/125 |

FOREIGN PATENT DOCUMENTS

| 81239 | 6/1983 | European Pat. Off. | 360/113 |
| 3210549 | 3/1982 | Fed. Rep. of Germany | 360/113 |
| 54-128315 | 10/1979 | Japan | 360/119 |
| 55-34324 | 3/1980 | Japan | 360/125 |
| 55-139624 | 10/1980 | Japan | 360/125 |
| 56-44115 | 4/1981 | Japan | 360/113 |
| 56-87219 | 7/1981 | Japan | 360/125 |
| 57-162114 | 10/1982 | Japan | 360/113 |
| 57-162112 | 10/1982 | Japan | 360/113 |
| 57-205810 | 12/1982 | Japan | 360/113 |
| 58-102321 | 6/1983 | Japan | 360/113 |
| 2006509 | 5/1979 | United Kingdom . | |

Primary Examiner—Robert S. Tupper
Assistant Examiner—Matthew J. Bussan
Attorney, Agent, or Firm—Wenderoth, Lind & Ponack

[57] ABSTRACT

In a magnetic head for perpendicular magnetization recording of a main magnetic pole exited type, a high permeability magnetic thin layer is held at its top portion by nonmagnetic supporter and the thin layer is closed by a first high permeability block. The thus constructed main magnetic pole is surrounded by a second high permeability block, and a third high permeability block is located in facing relation to the main magnetic pole and second high permeability material. This magnetic head has high recording and reproducing efficiency and well-shielded from external magnetic field. Some structural improvements are also provided so that leakage of magnetic flux, disconnection and short circuit of a coil are avoided.

10 Claims, 14 Drawing Figures

MAGNETIC HEAD FOR EFFECTING PERPENDICULAR MAGNETIC RECORDING

BACKGROUND OF THE INVENTION

This invention relates generally to magnetic heads for recording and reproducing information or data on and from a magnetic recording medium, such as a magnetic recording disk or the like, and more particularly, the present invention relates to a perpendicular magnetization recording magnetic head with which magnetization is effected in a direction perpendicular to the plane of a magnetic recording medium.

Perpendicular magnetization recording techniques have been introduced in order to increase the density of information to be recorded or written on a magnetic recording medium. Such a perpendicular magnetization recording method is disclosed, for instance, in U.S. Pat. No. 4,210,946. In a known technique for effecting perpendicular magnetization with respect to a recording medium, a magnetic head having a main pole to be excited is employed for magnetizing a small area on a magnetic recording medium such as a recording disk or sheet. The main pole is constructed of a thin magnetic layer or film made of high permeability material, and a supporter made of a nonmagnetic material in such a manner that the thin magnetic film is sandwiched between a pair of nonmagnetic members constituting the supporter. A coil is wound outside the supporter to thereby construct a magnetic head chip for a main pole extracting type magnetic head. This type of magnetic head is able to record or reproduce information or data from one side of the recording medium in the same manner as a conventional ring type magnetic head, so that the magnetic head is superior for practical use for perpendicular magnetization.

To raise the efficiency of the main pole excited type magnetic head, it is required to increase the amount of interlinkage of the magnetic flux generated from the magnetic medium through the coil wound on the magnetic head. For this reason, it is desirable to lower the magnetic resistance of the magnetic path through the coil. However, in the conventional magnetic head, the magnetic resistance of the magnetic circuit is so relatively high that the recording and reproducing efficiency is low. The high magnetic resistance occurs for the following three reasons.

(1) The thin magnetic layer or film of high permeability material of the main pole is thin (on the order of 1 μm) and long (on the order of several mm).

(2) The magnetic path passes through air which has low permeability in the magnetic circuit established between the high permeability thin magnetic layer or film and high permeability layer of the recording medium.

(3) The high permeability layer of the recording medium has a thickness less than 1 μm and the length of the part thereof constituting the magnetic circuit is in the range of several mm.

As a result, the conventional main pole excited magnetic head for perpendiculer magnetization recording has low recording and reproducing efficiency.

Furthermore, the conventional magnetic head has the drawback of producing low signal to noise ratio because of magnetic flux caused by external noise. That is to say, unnecessary magnetic flux caused by the external noise rush into the main pole and interlink through the coil to be mixed with the signal picked up from the coil.

SUMMARY OF THE INVENTION

The present invention has been developed in order to remove the above-described drawbacks inherent to the conventional perpendicular magnetization recording magnetic head.

It is, therefore, an object of the present invention to provide a new and useful magnetic head for effecting perpendicular magnetization which improves remarkably the recording and reproducing efficiency.

Another object of the present invention is to provide a magnetic head for effecting perpendicular magnetization in which problems caused by external magnetic field are resolved.

A further object of the present invention is to provide a magnetic head for effecting perpendicular magnetization in which a coil terminal taken out from head chip without disconnection or short circuit.

In accordance with the present invention, there is primarily provided a magnetic head of perpendicular magnetization type comprising: a main magnetic pole having a thin layer made of high permeability magnetic material, a nonmagnetic supporter for holding said thin layer at a top portion thereof adjacent to or connected to a recorded medium, and a first high permeability magnetic material connected magnetically to the thin layer; a second high permeability magnetic material arranged adjacently to or connected to the main magnetic pole; and a third high permeability magnetic material arranged to face the main magnetic pole, in which the recording medium travels between the main magnetic pole and the third high permeability magnetic material.

BRIEF DESCRIPTION OF THE DRAWINGS

The object and features of the present invention will become more readily apparent from the following detailed description of the present embodiments taken in conjunction with the accompanying drawings in which.

The same or corresponding elements and parts are designated by like reference numerals throughout the drawings.

DETAILED DESCRIPTION OF THE PREFERRED EMBODIMENT

Prior to describing preferred embodiments of the present invention, a conventional perpendicular magnetization recording magnetic head will be discussed for a better understanding of the features of the present invention.

Figure 1:
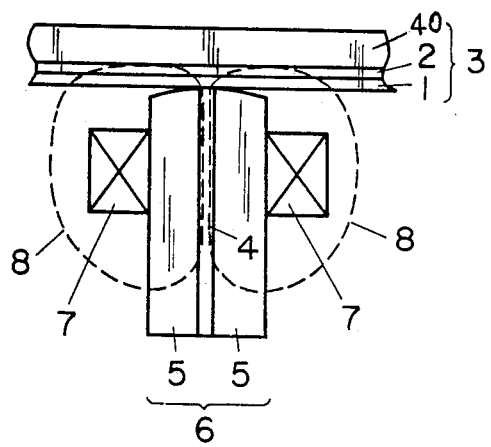
FIG. 1 is a schematic cross-sectional view showing a conventional magnetic head for perpendicular magnetization recording.

FIG. 1 illustrates a cross-section of a conventional perpendicular magnetization magnetic head of a main pole excited type. A magnetic recording medium 3 has a nonmagnetic base 40, made of a polyester film or the like, and two kinds of layers 1 and 2 made of magnetic materials. The layer 1 is a magnetic layer such as a film of alloy of Co and Cr showing perpendicular magnetic anisotropy. The layer 2 is a magnetic layer made of a high permeability material such as Permalloy (an alloy of Fe and Ni) showing in-plane magnetic anisotropy. Adjacent to or connected to the recording medium 3, a main magnetic pole 6 is arranged. The main magnetic pole 6 comprises a thin layer 4 made of a high permeability material, such as Permalloy, and supporters 5 made of a nonmagnetic material which holds the thin layer 4 therebetween. A coil 7 is wound around the main magnetic pole 6 to supply a recording signal or to pick up a reproducing signal. When recording, a recording current is supplied to the coil 7 and the magnetic flux generated by the current magnetizes the magnetic layer 1 at the part adjacent to the high permeability thin layer 4. When reproducing, the magnetic flux generated at the magnetized portion of the magnetic layer 1 adjacent to the high permeability thin layer 4 interlink the coil 7, passing through the magnetic circuit 8, whereby an electric signal is output from the coil 7.

Figure 2:
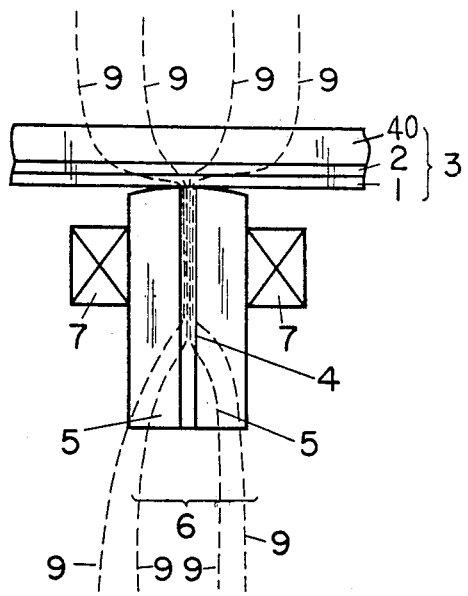
FIG. 2 is a schematic cross-sectional view showing the influence of external magnetic field on the conventional magnetic head.

However, the magnetic head shown in FIG. 1 has low recording and reproducing efficiencies as previously mentioned. Furthermore, the magnetic head is apt to be influenced by external magnetic fields as shown in FIG. 2. In FIG. 2, unnecessary external magnetic fields pass along the magnetic circuit 9 and interlinks through the coil 7. As a result, the external magnetic fields are mixed into the signal to be reproduced and picked up from the coil as a noise. This means that the high permeability thin layer 4 acts as an antenna for the external magnetic fields.

Figure 3:
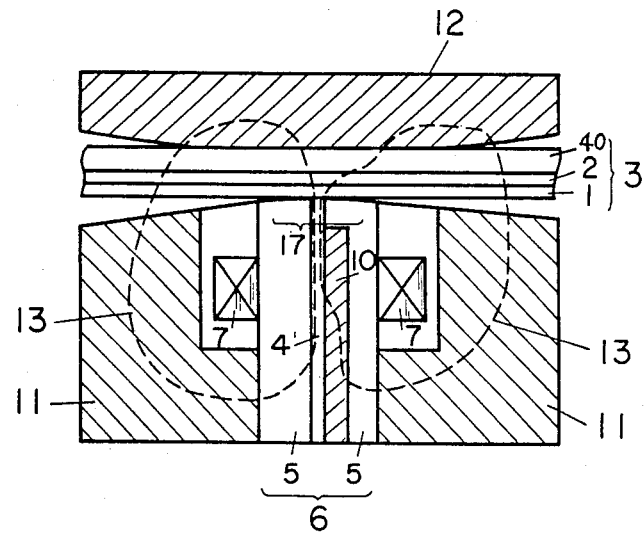
FIG. 3 is a schematic cross-sectional view of an embodiment of a magnetic head for perpendicular magnetization recording according to the present invention.

Referring now to FIG. 3, there is illustrated an embodiment of a magnetic head according to the present invention in cross section. The main magnetic pole 6 of this embodiment comprises a high permeability thin layer 4 located adjacently to or connected to the recording medium 3, a block 10 made of high permeability material, such as ferrites having a thickness several in the range of 10's to 200 $\mu$m, connected on one side of the high permeability thin layer 4 except for a top portion of the thin layer 4, and a nonmagnetic material 5 which holds the thin layer 4 and the block 10. On the top portion 17 of the main magnetic pole 6 where no block 10 of high permeability material exists, the thin layer 4 is supported directly by the nonmagnetic material 5. A coil 7 is wound around the main magnetic pole. Surrounding or connecting the main magnetic pole 6, a second block or core 11 made of high permeability material is provided which is partly connected to the nonmagnetic material 5. In addition, a third block 12 of high permeability material is provided facing the main magnetic pole 6 and a part of the core 11. The recording medium 3 travels between the main magnetic pole 6 and the third block 12. The core 11 does not necessary surround the main magnetic pole but may be connected to one side of the main magnetic pole.

In this construction, the magnetic resistance of the thin layer 4 is lowered remarkably by the aide of the first high permeability block 10 connected magnetically to the thin layer 4. Furthermore, the core 11 forms a part of a closed magnetic circuit 13 between the main magnetic pole 6 and the recording medium, which lower the magnetic resistance sharply, since the magnetic circuit does not pass through in air. The third high permeability block 12 forms another part of closed magnetic circuit 13 behind the recording medium. As a result, the distance of magnetic circuit 13 passing along the high permeability layer 2, which has high magnetic resistance, of the recording medium 3 is shortened, thereby effectively remarkably lowering the magnetic resistance of the high permeability layer 2.

As described above, the three high permeability blocks 10, 11 and 12 make the total magnetic resistance of the closed magnetic circuit remarkably low so as to improve the recording and reproducing efficiency of the magnetic head.

The high permeability thin layer 4 is manufactured by sputtering a material such as Permalloy, or an amorphous material containing cobalt (Co) and zirconium (Zr) in a layer on the order of 1 $\mu$m. The amorphous material containing Co and Zr, such as CoZrNb or CoFeZrNb, has high saturation magnetization and permeability. The first high permeability block 10 is made to ferrite, etc. in the dimension of 100 $\mu$m in thickness and 5 mm in length. The top portion 17 of the main magnetic pole 6, to which the first high permeability block 10 is not connected, has a length on the order of 100 $\mu$m. The core 11 is also made of ferrites, etc. and is formed large enough in comparison with the first high permeability block 10 to lower the magnetic resistance of the magnetic circuit. The third high permeability block 12 behind the magnetic medium is also made of ferrite, etc., and is so designed to have a large area facing the core 11, whereby the magnetic resistance of the magnetic circuit is lowered.

Figure 4:
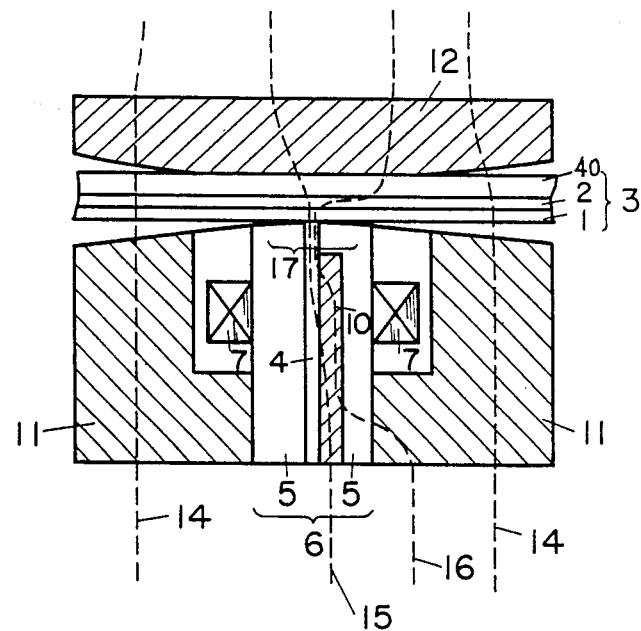
FIG. 4 is a schematic cross-sectional view showing the influence of external magnetic field on the embodiment of FIG. 3.

Referring now to FIG. 4, the influence of the external magnetic field on the embodiment in FIG. 3 will be discussed. The external magnetic field mostly passes through a magnetic circuit 14 which is formed through the core 11 having large passing area. On the other hand, the amount of the external magnetic field passing through the thin layer 4 of the main magnetic pole in magnetic circuits 15 and 16 is little because of small passing area of the thin layer 4 and the first high permeability block 10. Therefore, the main magnetic pole 6 is shielded from the external magnetic field and little external magnetic flux is interlinked through the coil 7.

Figure 5:
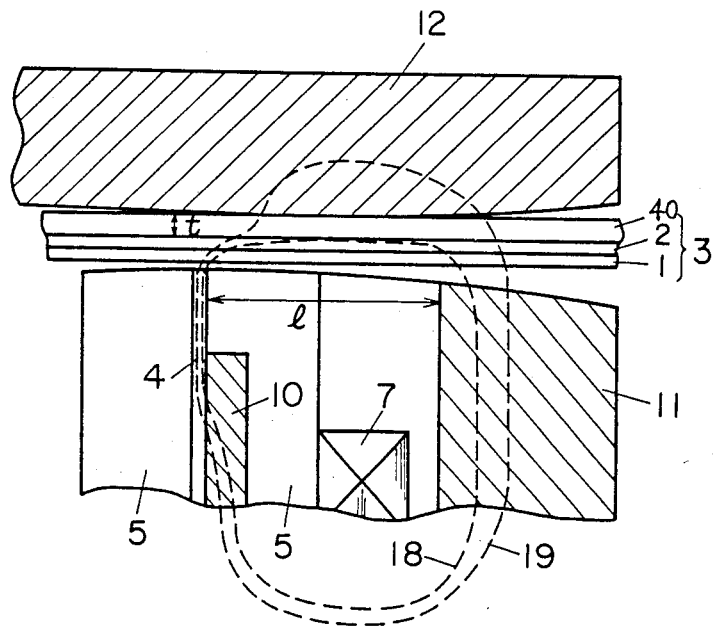
FIGS. 5 through 7 are schematic cross-sectional views each showing a part of the embodiment of FIG. 3 in an enlarged manner.

Referring now to FIG. 5, an enlarged view of the top portion 17 of the main magnetic pole 6 is illustrated. Numeral 18 designates a magnetic circuit which passes through the high permeability layer 2 of the recording medium. Numeral 19 designates a magnetic circuit which passes through the third high permeability block 12. For lowering the magnetic resistance of the magnetic circuit 19 in comparison with that of the magnetic circuit 18, it is necessary to design a distance l between the top portion of the high permeability layer 4 and the core 11 larger than the distance t between the third high permeability block 12 and the high permeability layer 2.

Figure 6:
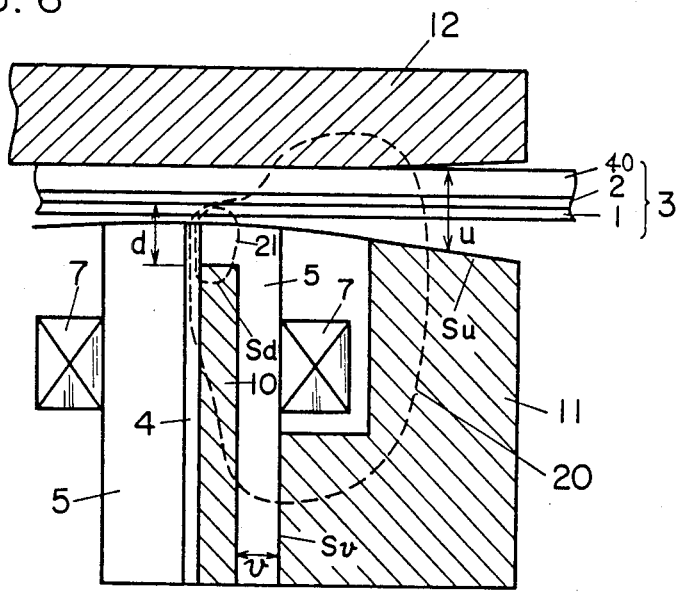

Referring now to FIG. 6, numeral 20 designates a magnetic circuit which interlinks through the coil 7, and the numeral 21 designates a magnetic circuit which does not interlink through the coil 7. In reproduction, it is desired to lower the magnetic resistance of the magnetic circuit 20 below that of the magnetic circuit 21 to interlink the magnetic flux from the recording medium sufficiently with the coil 7 when in the reproducing mode. To realize the above state, the following two conditions are required.

(1) The magnetic resistance between the first high permeability block 10 and the high permeability layer 2 is larger than that between the core 11 and the third high permeability block 12.

(2) The magnetic resistance between the first high permeability block 10 and the high permeability layer 2 of the recording medium 3 is larger than that between the first high permeability block 10 and the core 11.

In consideration that the magnetic resistance is proportional to the distance of a magnetic path and inverse proportional to the area of the magnetic path, the condition (1) is satisfied by designing $$d/Sd > U/Su$$

where Sd is a facing area of the first high permeability block 10 to the high permeability layer 2 of the recording medium 3; d is a mean distance value therebetween; Su is a facing area between the core 11 and the third high permeability block 12; and U is a mean distance value therebetween.

In the same manner, the condition (2) is satisfied by designing $$d/Sd > V/Sv$$

where d and Sd are the notation mentioned above, while Sv is a facing area between the first high permeability block 10 and the core 11; and v is a mean distance therebetween.

Figure 7:
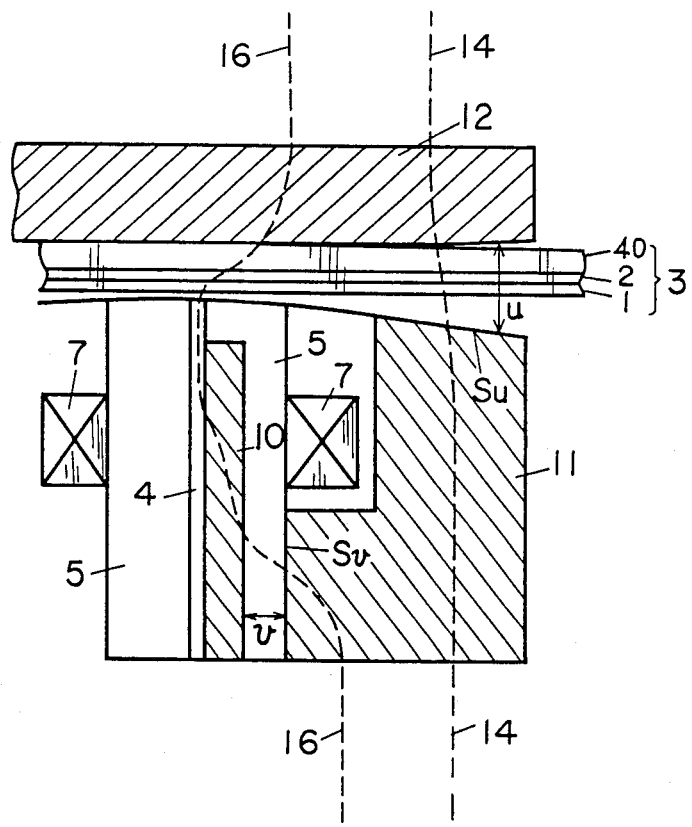

Referring now to FIG. 7, a condition for minimizing the noise which depends on the external magnetic fields will be discussed. Some of the external magnetic fields pass through the core 11 as illustrated by magnetic path 14 in FIG. 7. On the other hand, some of the external magnetic fields pass thin layer 4, the first high permeability block 10 and the core 11 as illustrated by magnetic path 16 in FIG. 7. The magnetic path 16 interlinks through the coil 7 and this is mixed into the signal to be recorded or reproduced as a noise signal. To avoid or minimize the mixing of the noise signal based on the external magnetic field, it is desirable that the magnetic resistance of the magnetic path 16 is relatively larger than that of the magnetic path 14, so that most of the magnetic flux of the external magnetic fields pass through the magnetic head along the magnetic path 14. To realize this state, it is required that the magnetic resistance between the first high permeability block 10 and the core 11 is larger than that between the core 11 and the third high permeability block 12. Therefore, it is desired to design $$V/Sv > U/Su$$

where Sv, V, Su and U are the notations previously described.

In order to manufacture the previously described magnetic head for practical use, it is important to satisfy the following conditions.

(1) To connect a head chip, which contains the main magnetic pole 6 and the coil 7, and the second block or core 11 with as low a magnetic resistance as possible.

(2) To take out the terminal of the coil 7 of the head chip without disconnection and short circuit.

(3) To avoid the contact between the first high permeability block 10 and the core 11 at the position between the coil 7 and the recording medium 3 on both sides of the head chip in the track width direction of the head chip. This prevents the leakage of magnetic flux to the core 11 without interlinking through the coil 7.

Figure 8:
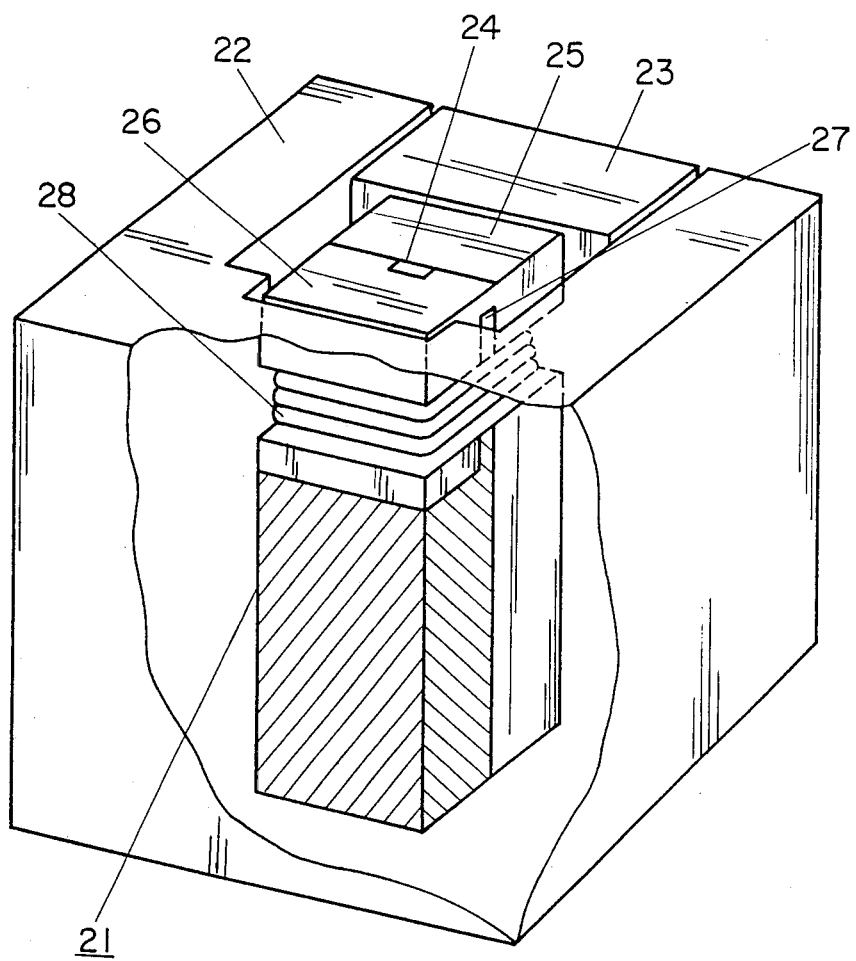
FIG. 8 is a schematic perspective view of a modified embodiment of a magnetic head according to the present invention partly broken away for clarity.

FIG. 8 shows an embodiment for realizing the above mentioned conditions in a practical manner. FIG. 8 illustrates a perspective view of the structure assembling the head chip 21 and surrounding cores 22, 23 removing third high permeability block 12 in FIG. 3. The surrounding cores 22 and 23 correspond to the second high permeability block or core 11. Numeral 24 designates a high permeability magnetic thin layer made of Permalloy or amorphous material containing Co and Zr. The thin layer 24 is sandwiched by supporting members 25 and 26. The supporting member 25 is made of nonmagnetic material; on the other hand, the supporting member 26 is made of nonmagnetic material at its top portion and of high permeability magnetic material at its remaining portion (hatched portion in FIG. 8). Around the supporting members 25 and 26, a recess is formed in which a coil 28 for recording and reproducing signals are wound. Numeral 22 denotes a surrounding core having a concave groove in which the head chip 21 is inserted. Numeral 23 denotes a plane core which surrounds the head chip 21 with the surrounding core 22.

Figure 9A:
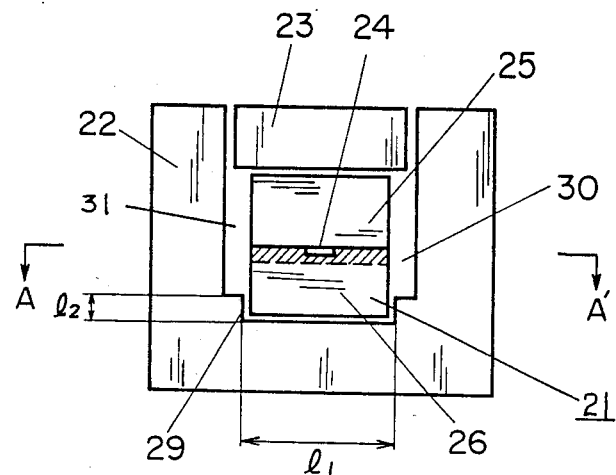
FIGS. 9A and 9B are respectively a schematic plane view of the embodiment of FIG. 8 and a cross-sectional view taken along the line A—A' of FIG. 9A, and FIGS. 10A through 10D are a schematic perspective views showing a manufacturing process of a core portion of the embodiment of FIG. 8.
Figure 9B:
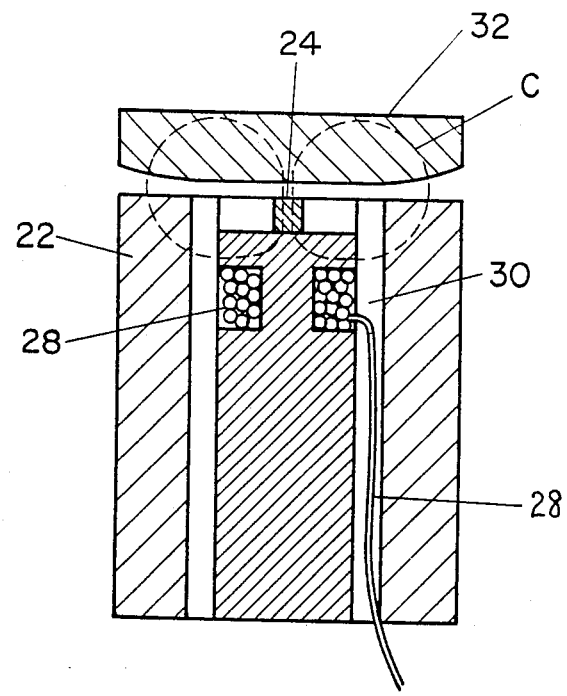
Figure 10A:
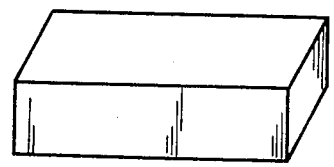
Figure 10B:
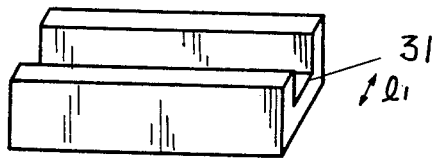
Figure 10C:
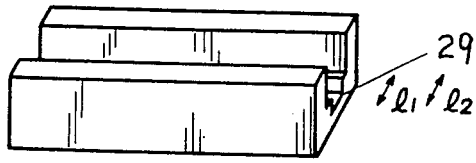
Figure 10D:
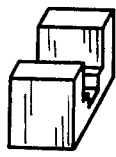

FIGS. 9A and 9B are a plan view of the magnetic head shown in FIG. 8 and it's cross-sectional view along the line A-A' of FIG. 9A.

The concave groove formed on the surrounding core 22 has a groove portion 29 at the bottom thereof. The groove portion 29 has dimensions of $l_1$ in width $l_2$ in depth into which the head ship 21 is inserted to be fixed by an adhesive. By fixing the head chip 21 to the groove portion 29 of the surrounding core 22, the shift of the head chip is avoided when assembling or moulding them. As a result, it is possible to prevent the disconnection or the short circuit of the coil 28 when assembling them which could otherwise occur by catching the coil 28 between the surrounding core 22 and head chip 21 or removing the insulative cover of the coil 28 between the surrounding core 22 and head chip 21.

A gap 30 between the surrounding core 22 and head chip 21 makes the high permeability thin layer 27 not to contact directly to the surrounding core. Therefore, a large magnetic gap is formed in an undesirable magnetic path C in FIG. 9B so that the magnetic path C has large magnetic resistance which is difficult to pass magnetic flux therethrough. Consequently, magnetic flux which flows into the top of the high permeability thin layer 27 interlinks through the coil 28 without leakage into the surrounding core 22 to obtain high power output signal from the coil 28. Furthermore, the gap 30 is useful to take out the terminal of the coil 28. Numeral 32 designates a high permeability block for forming a closed magnetic path, which corresponds to the third high permeability block 12 in FIG. 3.

Referring now to FIG. 10, a method of manufacturing the surrounding core 22 will be discussed. First of all, a rectangular parallelepiped ferrite body is provided as shown in FIG. 10A. Next, a groove 31 is formed on the ferrite body as shown in FIG. 10B. The groove 31 has a width corresponding to the sum of the head chip width and 2 times the width of gap 30 illustrated in FIG. 9A or 9B. At the bottom of the groove 31, another groove 29 is formed as shown in FIG. 10C. The groove 29 has a width $l_2$ which corresponds to a width of the head chip 21 and a depth $l_2$. Finally, the grooved ferrite body is cut to the necessary length $l_3$ as shown in FIG. 10D. If three multiblades are used to form the grooves 29 and 31 by adjusting the thicknesses and diameters of the blades, the grooves 29 and 31 are formed together.

In the embodiment shown in FIGS. 9A and 9B, the gap 30 is formed in the surrounding core 22, but it is also possible to form it on the head chip 21.

The above-described embodiments are just examples of the present invention, and therefore, it will be apparent for those skilled in the art that many modifications and variations may be made without departing from the spirit of the present invention.

What is claimed is:

1. A magnetic head for magnetization of a magnetic tape in a thickness direction perpendicular to the length and width of the tape as the tape moves in the longitudinal direction of its length, comprising:

a main magnetic pole having a top surface, and having
  a thin layer of high permeability magnetic material, extending in said thickness direction and having an end in said top surface for facing the tape moving thereacross in said longitudinal direction,
  nonmagnetic supporter means for holding said thin layer at a top portion of said main magnetic pole adjacent to the magnetic tape, and
  a first block of high permeability magnetic material magnetically connected to said thin layer;
a second block of high permeability magnetic material adjacent said main magnetic pole; and
a third block of high permeability magnetic material, facing said top surface is spaced relation thereto so as to define a path for longitudinal movement of the tape therebetween;
said magnetic head having such dimensions that $d/Sd > U/Su$ $d/Sd > V/Sv,$ where Sd is a facing area of said first block to said high permeability magnetic layer, d is a mean distance valve therebetween, Su is a facing area between said second and third blocks, u is a mean distance value therebetween, Sv is a facing area between said first and second blocks, and V is a mean distance value therebetween.

2. A magnetic head for magnetization of a magnetic tape in a thickness direction perpendicular to the length and width of the tape as the tape moves in the longitudinal direction of its length, comprising:

a main magnetic pole having a top surface, and having
  a thin layer of high permeability magnetic material, extending in said thickness direction and having an end in said top surface for facing the tape moving thereacross in said longitudinal direction,
  nonmagnetic supporter means for holding said thin layer at a top portion of said main magnetic pole adjacent to the magnetic tape, and
  a first block of high permeability magnetic material magnetically connected to said thin layer;
a second block of high permeability magnetic material adjacent said main magnetic pole; and
a third block of high permeability magnetic material, facing said top surface is spaced relation thereto so as to define a path for longitudinal movement of the tape therebetween; said magnetic head having such dimensions that $V/Sv > U/Su,$ wherein Sv is a facing area between said first and second blocks, V is a mean distance value therebetween, Su is a facing area between said second and third blocks, and u is a mean distance value therebetween.

3. A magnetic head for magnetization of a magnetic tape having a high permeability layer in a thickness direction perpendicular to the length and width of the tape as the tape moves in the longitudinal direction of its length, comprising:

a main magnetic pole having a top surface, and having
  a thin layer of high permeability magnetic material, extending in said thickness direction and having an end in said top surface for facing the tape moving thereacross in said longitudinal direction,
  nonmagnetic supporter means for holding said thin layer at a top portion of said main magnetic pole adjacent to the magnetic tape, and
  a first block of high permeability magnetic material magnetically connected to said thin layer;
a second block of high permeability magnetic material adjacent and main magnetic pole; and
a third block of high permeability magnetic material, facing said top surface and said second block in spaced relation thereto so as to define a path for longitudinal movement of the tape therebetween, wherein a distance 1 between a top portion of said thin layer of high permeability material and said second block is larger than a distance t between the high permeability magnetic layer of the tape and said thid block when the tape is moving along said path.

4. A magnetic head as claimed in claim 3, wherein the recording medium comprises a base of nonmagnetic material, a first magnetic layer of high permeability magnetic material formed on said base, and a second magnetic layer having vertical magnetization anisotropy, formed on said first layer.

5. A magnetic head as claimed in claim 3, wherein said second block high permeability magnetic material surrounds said main magnetic pole.

6. A magnetic head as claimed in claim 3, wherein said thin layer of high permeability material is made of an amorphous material containing Co and Zr.

7. A magnetic head as claimed in claim 6, wherein said amorphous material is an alloy of Co, Fe, Zr and Nb.

8. A magnetic head as claimed in claim 3, further comprising a coil wound around said main magnetic pole.

9. A magnetic head as claimed in claim 3, wherein said thin layer of high permeability material has a top portion at said top surface, said first block being in contact with said thin layer of high permeability material, all along the extent of said thin layer of higher permeability material in said thickness direction except along said top portion of said thin layer of high permeability material.

10. A magnetic head as claimed in claim 3, wherein said first block has exposed side surfaces on side walls of said magnetic pole, air gaps being provided between said exposed surfaces and said second block, said second block having a concave groove formed therein, and one surface portion of said main magnetic pole excluding said top surface being fixedly inserted in said groove.

* * * * *